United States Patent
Lin et al.

(10) Patent No.: US 11,342,835 B2
(45) Date of Patent: May 24, 2022

(54) SURGE PROTECTION FOR DIGITAL INPUT MODULE

(71) Applicant: Texas Instruments Incorporated, Dallas, TX (US)

(72) Inventors: Yihuang Lin, Dallas, TX (US); Abhijeeth Aarey Premanath, Allen, TX (US); Anant Shankar Kamath, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 166 days.

(21) Appl. No.: 16/736,235

(22) Filed: Jan. 7, 2020

(65) Prior Publication Data

US 2021/0211039 A1 Jul. 8, 2021

(51) Int. Cl.
*H02M 1/32* (2007.01)
*H02M 7/06* (2006.01)

(52) U.S. Cl.
CPC .............. *H02M 1/32* (2013.01); *H02M 7/06* (2013.01)

(58) Field of Classification Search
CPC .... H02M 1/0048; H02M 1/0051; H02M 1/14; H02M 1/143; H02M 1/32; H02M 7/06; H02M 7/062
See application file for complete search history.

(56) References Cited

U.S. PATENT DOCUMENTS

| | | | |
|---|---|---|---|
| 3,697,820 A * | 10/1972 | Ehret | H02M 7/125 361/159 |
| 7,361,942 B1 * | 4/2008 | Matteson | H01L 27/0814 257/106 |
| 10,062,682 B1 * | 8/2018 | Mallikarjunaswamy | H01L 23/535 |
| 2005/0189619 A1 * | 9/2005 | Walters | H01L 29/868 257/601 |
| 2008/0217749 A1 * | 9/2008 | Matteson | H01L 27/0255 257/656 |
| 2010/0155774 A1 * | 6/2010 | Tseng | H01L 29/87 257/173 |
| 2015/0257211 A1 * | 9/2015 | Johnson | H05B 45/00 315/121 |
| 2015/0282260 A1 * | 10/2015 | Hussell | H05B 45/00 315/51 |
| 2016/0050724 A1 * | 2/2016 | Moon | H05B 45/48 315/200 R |
| 2019/0064274 A1 * | 2/2019 | Fu | H02J 9/062 |
| 2020/0135714 A1 * | 4/2020 | Mallikarjunaswamy | H01L 29/861 |

(Continued)

*Primary Examiner* — Nguyen Tran
(74) *Attorney, Agent, or Firm* — Michael T. Gabrik; Charles A. Brill; Frank D. Cimino

(57) ABSTRACT

A circuit for providing input surge protection in a digital input module, the circuit comprising a surge protection input stage, including a bridge rectifier coupled to receive the bidirectional input signal, and coupled to the unidirectional input of the digital input module. The bridge rectifier comprises TVS rectifiers TVS1 and TVS2, and diode rectifiers D2 and D3, intercoupled in a bridge rectifier configuration in which: TVS1 and TVS4 are transient voltage suppression diodes; and rectifiers D2 and D3 are rectifier diodes. Diodes TVS1 and TVS4 can be implemented as either respective unidirectional TVS diodes; or a single bidirectional TVS diode. The digital input module can be a digital input receiver, or a opto-isolator/coupler, or other digital input module.

17 Claims, 6 Drawing Sheets

(56) References Cited

U.S. PATENT DOCUMENTS

2020/0249711 A1* 8/2020 Saxby .................... H02H 9/041
2020/0373829 A1* 11/2020 Mouridsen ............. H02H 9/005

* cited by examiner

SURGE PROTECTION FOR DIGITAL INPUT MODULE

BACKGROUND

Many industrial applications require monitoring DC and AC voltages using digital input modules or binary input modules. The monitoring circuits must withstand electrical transients as governed by electrical transient protection standards (specifications) for ESD (Electrostatic Discharge Immunity) (IEC 610000-4-2), EFT (Electrical Fast Transient/Burst Immunity) (IEC 610000-4-4) and Surge Immunity (IEC 610000-4-5). Examples include power supply and battery monitors, and receivers of status signals from sensors, switches and relays.

Protection circuits can be used to effectively suppress Surge, ESD and EFT for bidirectional digital input receivers/modules for various applications including CNC (computer numerical controllers), PLC (programmable logic controllers), motor drivers/controllers, and grid infrastructure. Surge protection can be based on TVS (transient voltage suppression) diodes in parallel with the digital input module to provide a shunt path for transient suppression.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of the disclosed invention.

The Disclosure describes apparatus and methods for bidirectional surge protection based on a bidirectional bridge rectifier with integrated TVS, such as can be used as an input stage surge protector for an integrated circuit.

According to aspects of the Disclosure, a circuit for digital input with surge protection, includes surge protection circuitry with bidirectional input terminals to receive a bidirectional input signal. The surge protection circuitry includes a bridge rectifier circuit with an input coupled to the bidirectional input terminals to receive the bidirectional input signal, and an output coupled to the unidirectional input to the digital input circuit. The bridge rectifier including rectification legs designated D1, D2, D3, and D4, intercoupled in a bridge rectifier configuration: rectification legs D1 and D4 including transient circuit suppression (TVS) diodes; rectification legs D2 and D3 including rectifier diodes.

According to other aspects of the Disclosure, a circuit is configured to provide input surge protection for a digital input module that includes a unidirectional input. The circuit includes bidirectional input terminals to receive a bidirectional input signal, and a bridge rectifier circuit with an input coupled to the bidirectional input terminals to receive the bidirectional input signal, and a unidirectional output. The bridge rectifier includes rectification legs designated D1, D2, D3, and D4, intercoupled in a bridge rectifier configuration: rectification legs D1 and D4 including transient circuit suppression (TVS) diodes; rectification legs D2 and D3 including rectifier diodes.

According to other aspects of the Disclosure, a circuit is configured to input surge protection for a digital input module that includes a unidirectional input. the circuit includes bridge rectification means for receiving a bidirectional input signal, and for providing a unidirectional output signal. The bridge rectification means includes rectification legs designated D1, D2, D3, and D4, intercoupled in a bridge rectifier configuration, including: transient circuit suppression (TVS) means included in diode legs D1 and D4; and rectification means included in rectification legs D2 and D3.

Other aspects and features of the invention claimed in this Patent Document will be apparent to those skilled in the art from the following Disclosure.

BRIEF DESCRIPTION OF THE DRAWINGS

FIG. 2A illustrates an example digital input isolator 100A including a surge protection input stage 110; and FIG. 2B illustrates an example digital input optoisolator 100B including a surge protection input stage 110.

FIGS. 3A-3B illustrate bidirectional operation for respectively positive and negative input cycle for implementations with separate integrated TVS diodes TVS1/TVS4; and FIG. 3C illustrates bidirectional operation for implementations with an integrated bidirectional TVS1/4 in the D1/D4 rectifier legs.

FIG. 4A illustrates normal input voltage; FIG. 4B illustrates surge protection.

DESCRIPTION

This Description and the Drawings constitute a Disclosure, including design examples and implementations, and including illustrating various technical features and advantages for: digital input with bidirectional surge protection based on a bidirectional bridge rectifier with integrated TVS (transient voltage suppression).

Example applications are a high voltage (HV) digital receiver isolator or optocoupler with bidirectional surge protection, such as for input to an MCU/host controller.

This Disclosure uses the following nomenclature. bidirectional includes signal inputs that are bi-polar (positive and negative) with respect to ground, and AC signal inputs.

Figure 1:
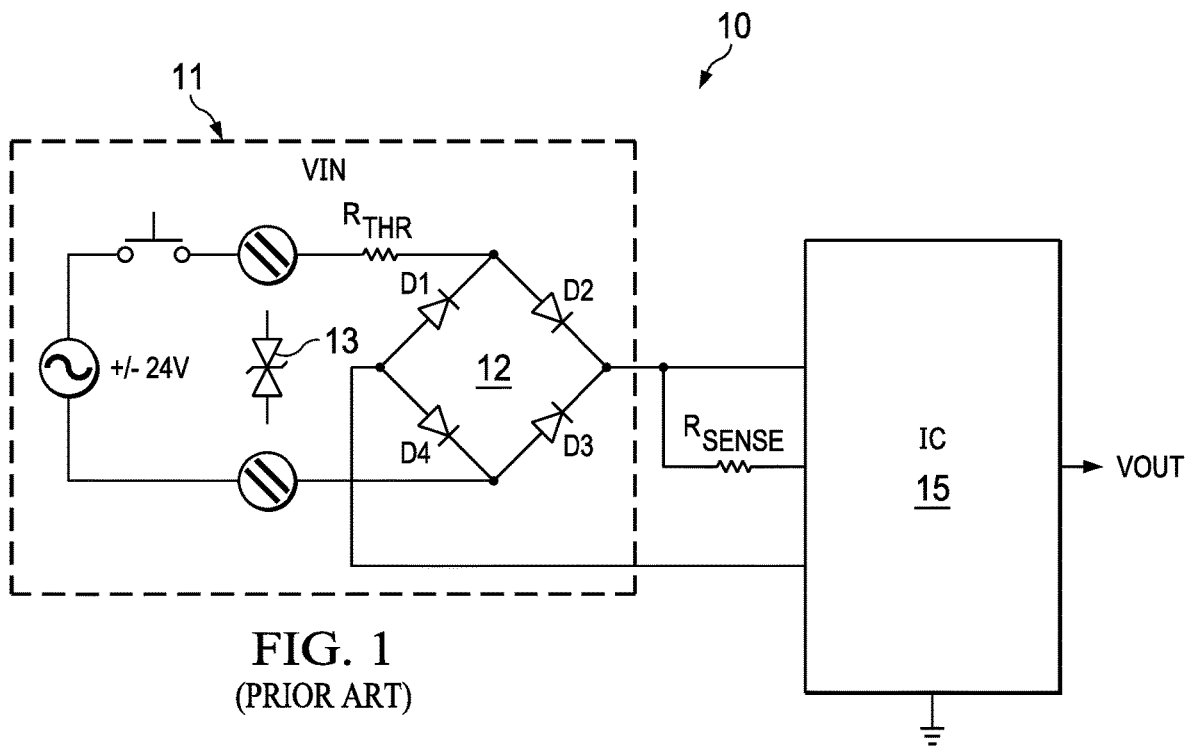
FIG. 1 illustrates one approach for a digital input circuit 10 including a surge protection input stage 11 using a bridge rectifier (D1-D4) 12, and parallel bidirectional TVS diodes 13 as an input stage to an integrated circuit 15, such as a HV isolator.

FIG. 1 illustrates one approach for surge protection using a bridge rectifier D1-D4, in combination with a parallel bidirectional TVS diode 20 as an input stage to an IC (integrated circuit), such as a HV digital input receiver/isolator module, or an optocoupler. Disadvantages of this approach include board temperature, board size, and cost (disadvantages particularly apparent in high-density compact multi-channel DI board input designs).

Figure 2A:
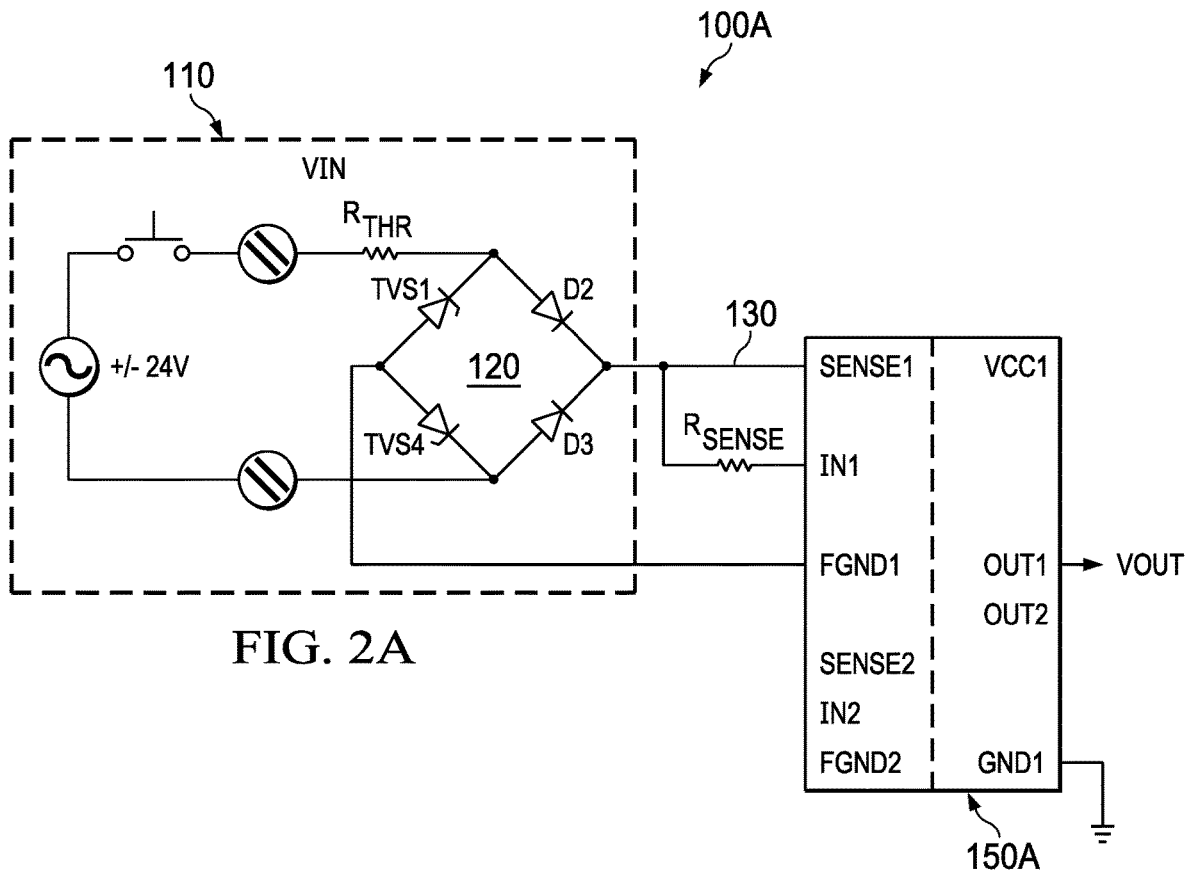
FIGS. 2A-2B illustrate example digital input circuit designs 100A/100B including input stage surge protection 110 based on a bidirectional bridge rectifier 120 with integrated unidirectional TVS diodes (TVS1/TVS4) according to the Disclosure.
Figure 2B:
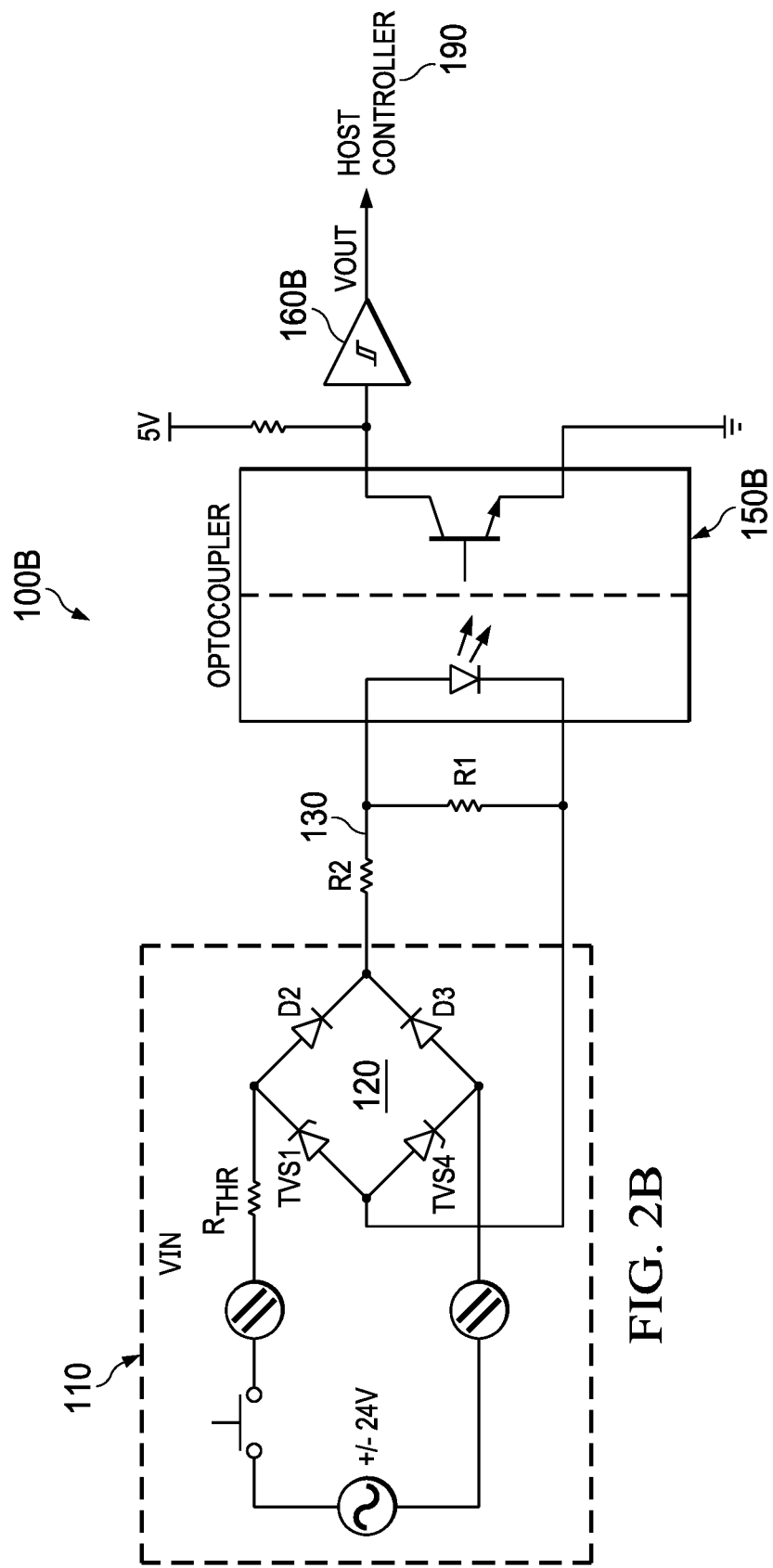

FIGS. 2A-2B illustrate example digital input circuits providing HV bidirectional signal detection designs 100A/100B including input stage surge protection 110 based on a bidirectional bridge rectifier 120 with integrated unidirectional TVS diodes (TVS1/TVS4), providing HV bidirectional signal detection, according to the Disclosure. FIG. 2A illustrates an example digital input isolator 100A including a surge protection input stage 110. FIG. 2B illustrates an example digital input optoisolator 100B including a surge protection input stage 110 example surge protection circuit 100 includes a bridge rectifier 120. For the example optoisolator, a Schmitt trigger is included at the output, for example to interface to an MCU.

The surge protection input stage 110 includes a bidirectional bridge rectifier with integrated TVS. Bridge rectifier 120 includes rectification legs designated D1-D4. Bridge rectifier 120 can be implemented, according to aspects of the Disclosure, as illustrated with separate unidirectional TVS diodes TVS1 and TVS4 in rectification legs D1 and D4, or in a preferred implementation with a bidirectional TVS1/4 diode (in place of the separate unidirectional TVS1 and TVS4 diodes) forming the D1/D4 legs of the rectifier. In either implementation, the TVS diodes (included in the D1/D4 rectification legs) are respectively connected to the D2 and D3 rectifier diodes (included in the D2/D3 rectification legs).

The surge protection input stage is coupled to the isolation IC, such as digital isolator 150A or optoisolator 150B, through sense (and limiting) resistors 130.

Advantages of surge protection based on a bidirectional bridge rectifier with integrated TVS (separate unidirectional or single bidirectional) include: fewer components (diodes) and lower cost.

Figure 3A:
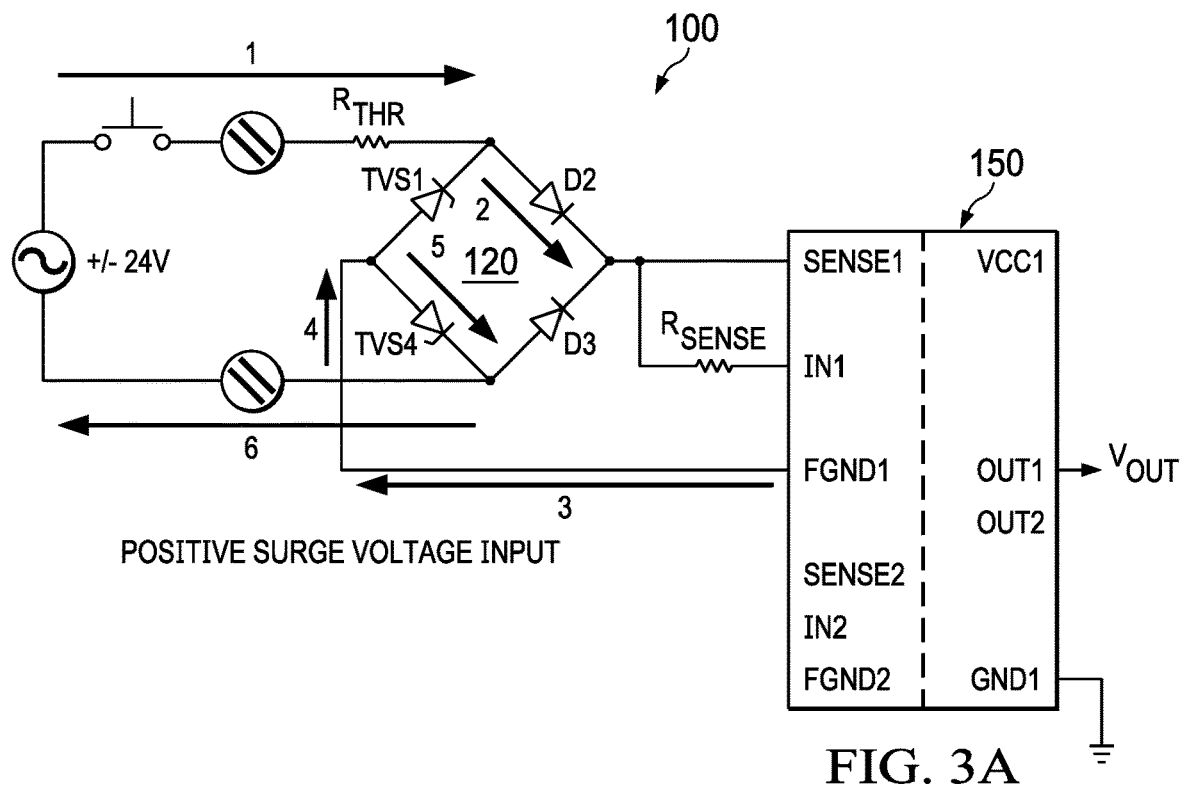
FIGS. 3A-3C illustrate operation of the example bidirectional bridge rectifier 120 of FIG. 2.
Figure 3B:
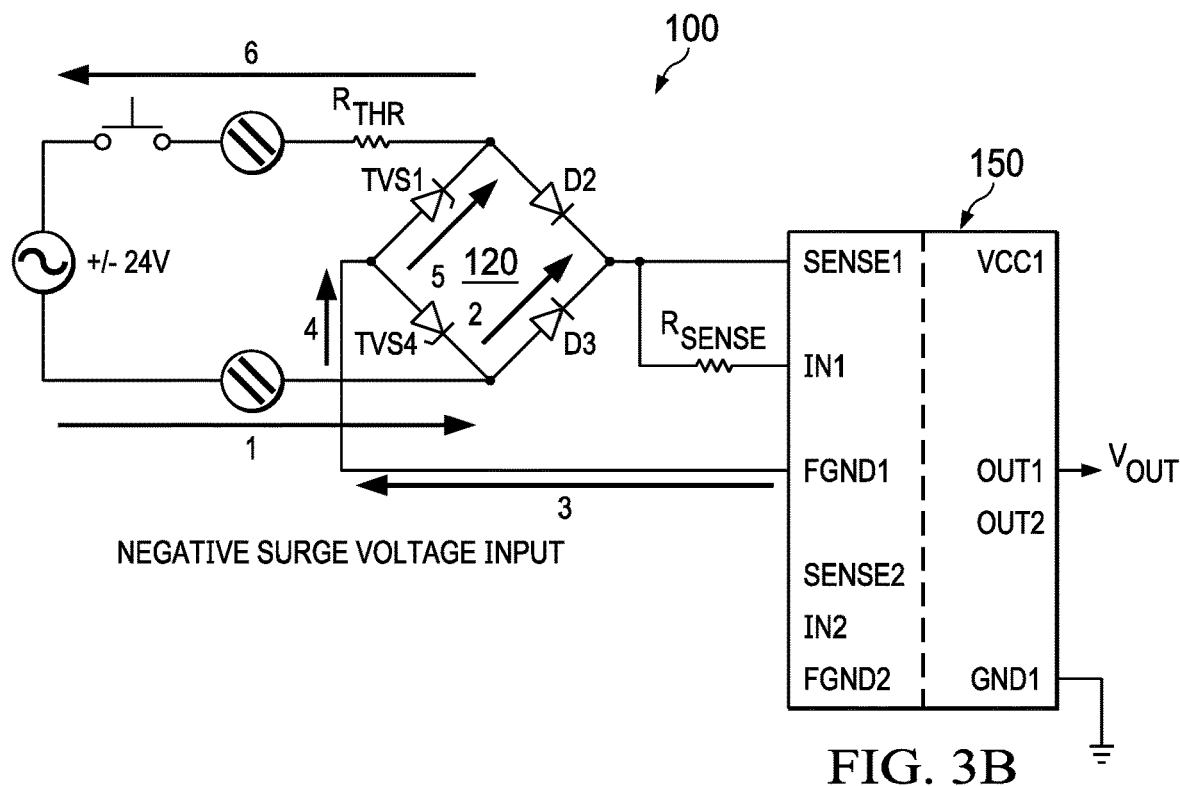
Figure 3C:
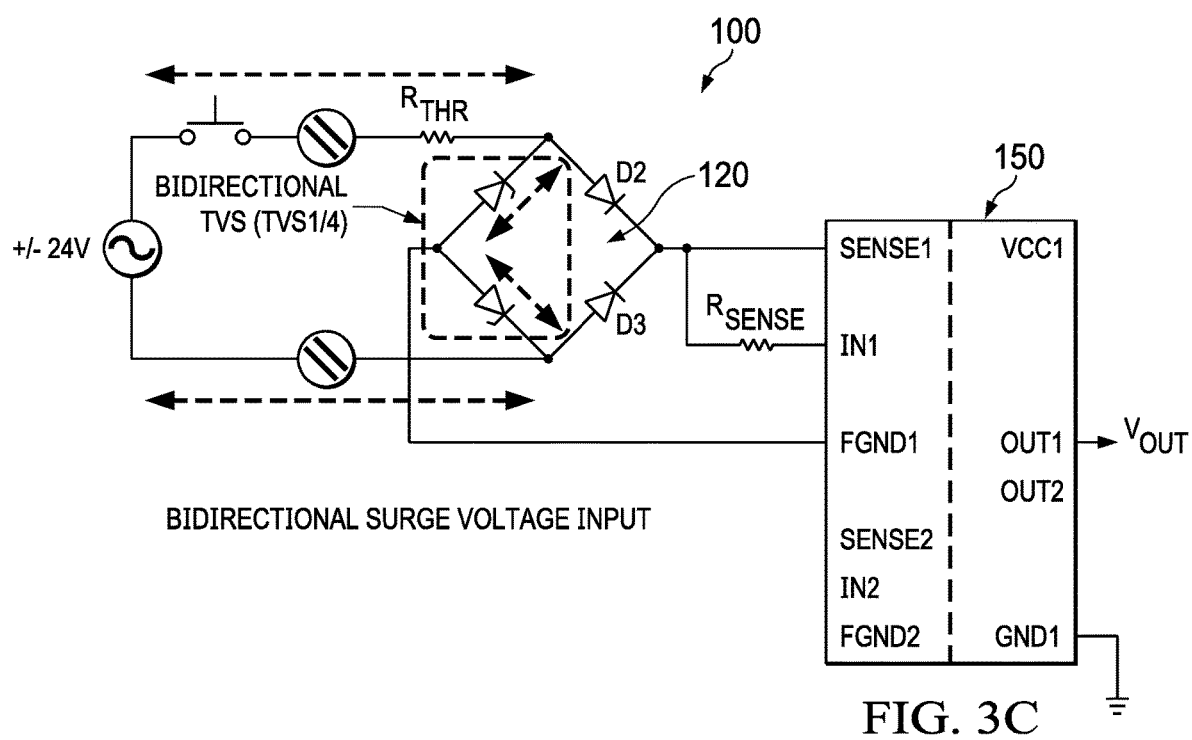

FIGS. 3A-3C illustrate operation of the example bidirectional surge protection bridge rectifier with integrated TVS diodes of FIG. 2. For the implementation of the bridge rectifier with separate integrated TVS diodes TVS1 and TVS4, FIG. 3A illustrates operation for the positive input cycle, and FIG. 3B illustrates operation for the negative input cycle. For the implementation of the bridge rectifier with an integrated bidirectional TVS1/4 (for purposes of illustration, shown as separate diodes with separate connection to the D2/D3 rectifier legs), FIG. 3C illustrates operation during either a positive or negative surge strike. In the presence of a high voltage/current surge the TVS diode that is under reverse bias breaks down, thus clamping the voltage to the other circuits to a safe value.

Figure 4A:
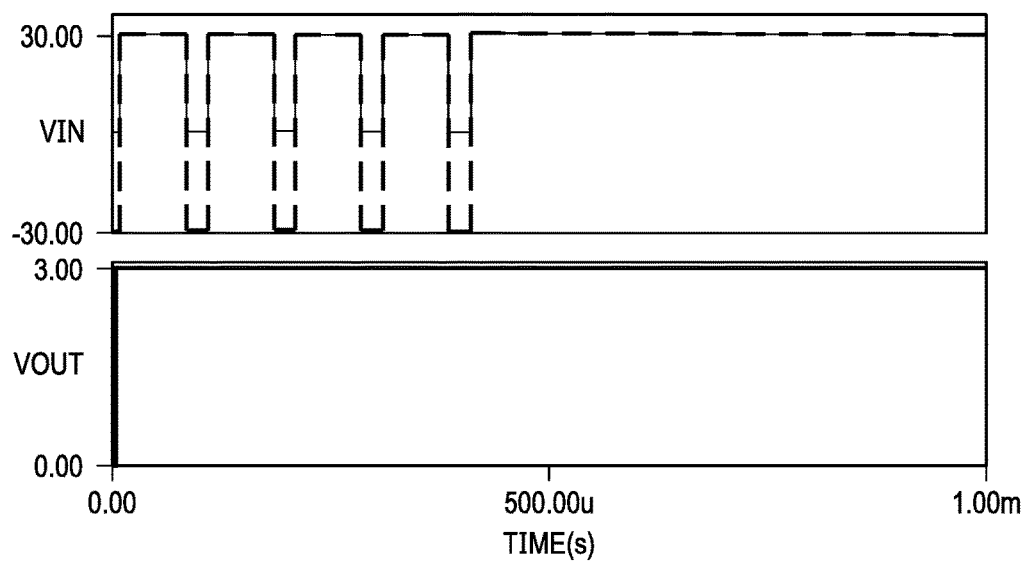
FIGS. 4A and 4B provide example waveforms illustrating bidirectional surge protection based on a bidirectional rectifier with integrated TVS diodes.
Figure 4B:
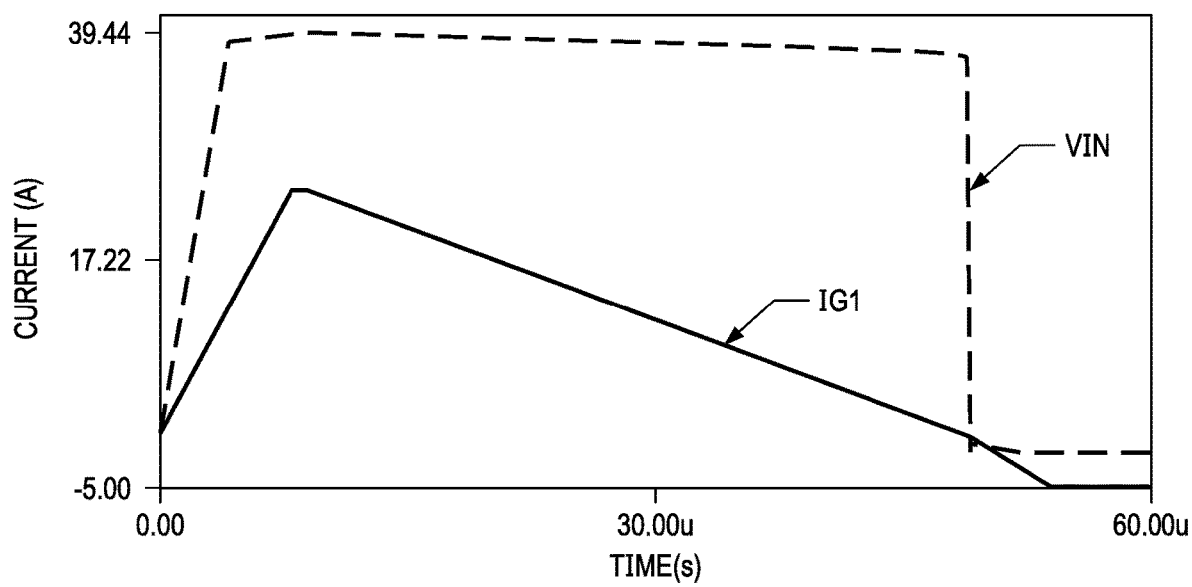

FIGS. 4A and 4B provide example waveforms illustrating bidirectional surge protection based on a bidirectional bridge rectifier with integrated TVS according to the Disclosure. FIG. 4A illustrates normal input voltage.

FIG. 4B illustrates surge protection. An example transient current IG1 represents a surge condition. The example surge protection circuit operates to withstand 25A for a period of time (for example, approximately 20 us), and VIN remains lower than a maximum specified input voltage (for example, approximately 40V).

Referring to FIGS. 2A-2B, the TVS diodes TVS1/TVS4 or the bidirectional TVS1/4 in the D1/D4 rectifier legs, and the rectifier diodes D2/D3 can be selected based on:

TVS D1/D4: $V_{BR} > V_{line(max)}$, $V_C < V_{RM(D2)}$, $V_C < V\text{max(in)}$ Diodes D2/D3: $V_{BR} > V_{line(max)}$, $V_{RM(D2)} > V_{c(D1)}$ where: VBR means the break down voltage; Vc is the clamping voltage; Vline means the absolute maximum ratings voltage on the input pin of digital isolator; Vmax(in) means the max voltage tolerance of isolator/optoisolator; and VRM means the peak repetitive reverse voltage. The TVS diodes TVS1/TVS4, and the rectifier diodes D2 and D3, can be matched or different (based on design/performance requirements).

Figure 5:
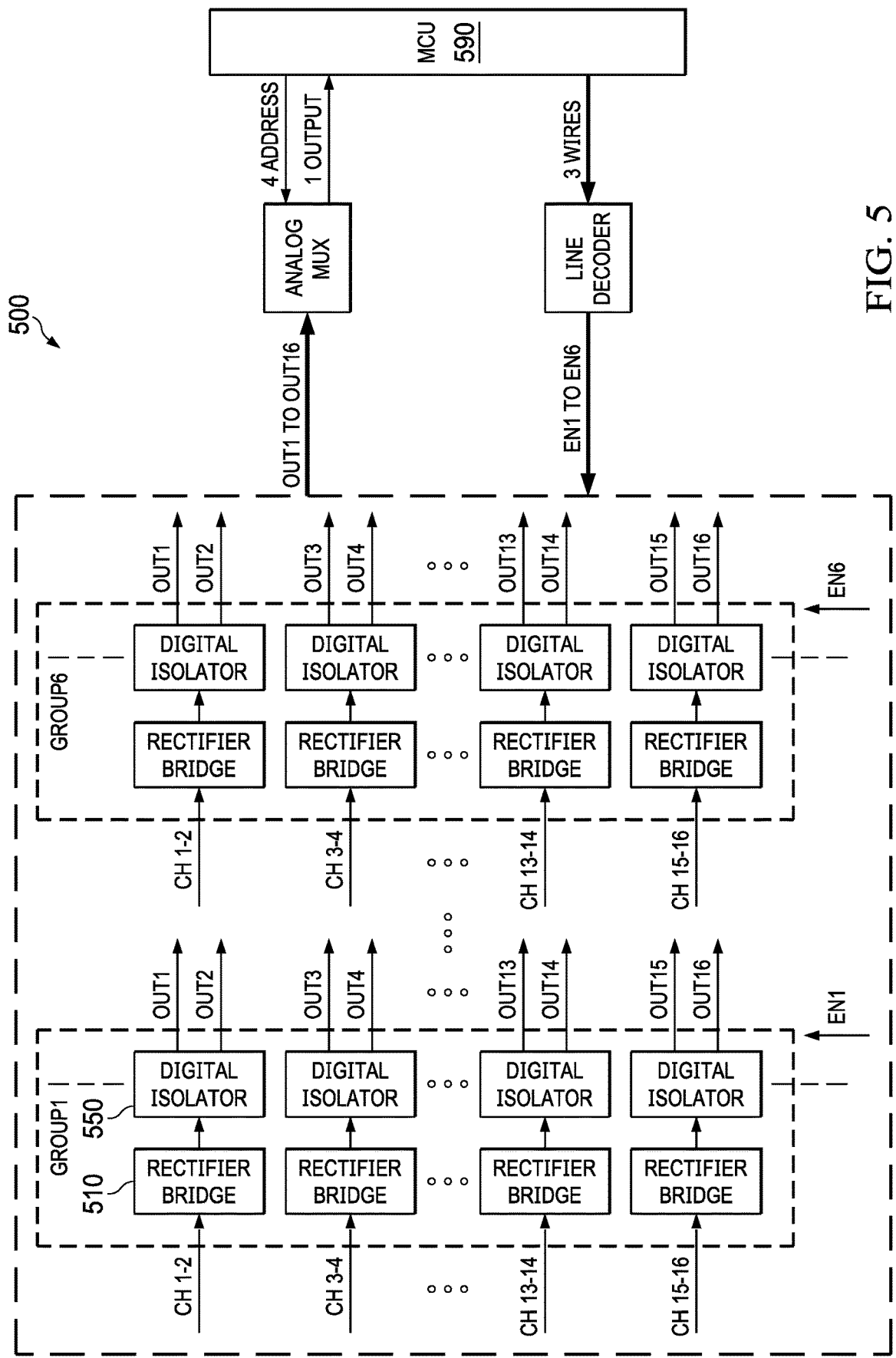
FIG. 5 illustrates an example 96-Channel bidirectional digital input board, with multiple digital input isolator modules, each with an integrated input stage bidirectional rectifier bridge 510, including integrated TVS according to the Disclosure.

FIG. 5 illustrates an example 96-Channel bidirectional digital input board, with multiple digital input isolator modules, each with an integrated input stage bidirectional rectifier bridge 510, including integrated TVS according to the Disclosure.

The system board design with 96 channel digital input modules includes 8 dual-channel isolator ICs in each of six groups. A 16 channel analog multiplexer selects 1 of 16 from a group enabled by a 3-to-6 line decoder. An MCU provides 0bit control to the analog multiplexer and 3 bit control to the line decoder, and receives the mux-selected data.

Example design parameters are:

| Features | Description |
| --- | --- |
| Max Input Voltage | 30 V |
| VIH High Transition Threshold | 18 V, max |
| Current limit on state | >3 mA at 18 V |
| Power consumption | 10 W |
| Temperature Rise | <30° C. |
| Number of channels | 96 |
| EMC test | Surge (1 kV DM, 1 kV CM) |

The Disclosure provided by this Description and the Figures sets forth example designs and applications illustrating aspects and features of the invention, and does not limit the scope of the invention, which is defined by the claims. Known circuits, connections, functions and operations are not described in detail to avoid obscuring the principles and features of the Disclosed example designs and applications. This Disclosure can be used by ordinarily skilled artisans as a basis for modifications, substitutions and alternatives, including adaptations for other applications.

The invention claimed is:

1. A system including surge protection, comprising:
   input terminals to receive a bidirectional input signal;
   a digital input circuit with a unidirectional input; and
   a bridge rectifier circuit with inputs respectively coupled to the input terminals to receive the bidirectional input signal, and an output coupled to the unidirectional input of the digital input circuit;
   the bridge rectifier including rectifier legs designated D1, D2, D3, and D4, intercoupled in a bridge rectifier configuration:
   rectifier legs D1 and D4 including respective transient voltage suppression (TVS) diodes coupled in series between the inputs of the bridge rectifier circuit; and
   rectifier legs D2 and D3 including respective rectifier diodes.

2. The system of claim 1, wherein the TVS diodes of D1 and D4 comprise respective unidirectional TVS diodes in which each of the unidirectional TVS diodes has a terminal of a first type and terminal of a second type and the terminals of the first type are coupled together.

3. The system of claim 1, further comprising a sense resistor to sense an input voltage to the unidirectional input of the digital input circuit.

4. The system of claim 1, wherein the digital input circuit comprises one of: a digital input receiver; or an optocoupler.

5. The system of claim 1, wherein the digital input circuit includes an output coupled to a processor.

6. A circuit for providing surge protection for a digital input module, the circuit comprising:
   input terminals to receive a bidirectional input signal; and
   a bridge rectifier circuit with inputs respectively coupled to the input terminals to receive the bidirectional input signal, and a unidirectional output;

the bridge rectifier including rectifier legs designated D1, D2, D3, and D4, intercoupled in a bridge rectifier configuration:
rectifier legs D1 and D4 including transient voltage suppression (TVS) diodes coupled in series between the inputs of the bridge rectifier circuit;
rectifier legs D2 and D3 including rectifier diodes.

7. The circuit of claim 6, wherein the unidirectional output is a unidirectional output terminal configured to be coupled to a unidirectional input of the digital input module.

8. The circuit of claim 6, wherein the TVS diodes of D1 and D4 comprise respective unidirectional TVS diodes in which each of the unidirectional TVS diodes has a terminal of a first type and terminal of a second type and the terminals of the first type are coupled together.

9. The circuit of claim 6, further comprising a sense resistor to sense an input voltage to a unidirectional input of the digital input module.

10. A circuit for providing surge protection for a digital input module, the circuit comprising:
bridge rectification means including inputs for receiving a bidirectional input signal, and an output for providing a unidirectional output signal;
the bridge rectification means including rectification legs designated D1, D2, D3, and D4, intercoupled in a bridge rectifier configuration;
the bridge rectification means including:
transient voltage suppression (TVS) diodes included in rectification legs D1 and D4, the TVS diodes coupled in series between the inputs of the bridge rectification means, and
rectification means included in rectification legs D2 and D3.

11. The circuit of claim 10, wherein the rectification means comprises rectifier diodes.

12. The circuit of claim 10, wherein the TVS diodes of D1 and D4 comprise respective unidirectional TVS diodes in which each of the unidirectional TVS diodes has a terminal of a first type and terminal of a second type and the terminals of the first type are coupled together.

13. The circuit of claim 10, wherein the unidirectional output is coupled to a unidirectional input of the digital input module.

14. The circuit of claim 10, further comprising a sense resistor to sense an input voltage to a unidirectional input of the digital input module.

15. The system of claim 1, wherein the TVS diodes of D1 and D4 comprise a bidirectional TVS diode.

16. The circuit of claim 6, wherein the TVS diodes of D1 and D4 comprise a bidirectional TVS diode.

17. The circuit of claim 10, wherein the TVS diodes of D1 and D4 comprise a bidirectional TVS diode.

\* \* \* \* \*